March 27, 1962 W. H. TANKE 3,026,945

SHIELD MOUNTING

Filed March 10, 1958

Inventor
Willard H. Tanke
by Howard B. Scheckman
Attorney

United States Patent Office 3,026,945
Patented Mar. 27, 1962

3,026,945
SHIELD MOUNTING
Willard H. Tanke, La Crosse, Wis., assignor to Allis-Chalmers Manufacturing Company, Milwaukee, Wis.
Filed Mar. 10, 1958, Ser. No. 720,218
5 Claims. (Cl. 172—509)

This invention relates to farm implements and more particularly to means for mounting a crop shield.

The purpose of a crop shield is to protect young plants from being covered by dirt during cultivation. However, during cultivation as the crop shield moves along the ground trash accumulates on the front of the shield. To clear the shield of the trash the shield is mounted so that it can be raised to permit the dirt that is flowing from the side to carry the trash away.

Previous shields have been mounted so that they are pulled by the tractor. However, with this pull type of mounting, the trailing portion of the shield must raise as high as, or even higher than, the leading portion of the shield to clear the trash. This permits a large amount of dirt to flow under the shield and cover the young plants. Also, with the pull type of mounting, it would require a complicated mounting to support the shields so that their spacing can be changed to accommodate different size plants, or so the shields can be easily raised with the cultivator and then returned to their original position, or so the height that the shield is above the ground can be adjusted so there will be a small flow of dirt under the shield to cover weeds growing between the plants.

It is an object of my invention to provide a simple shield mounting arrangement that prevents excess dirt from flowing beneath the shield when the shield is raised to clear accumulated trash.

It is an object of my invention to provide a simple shield mounting arrangement that permits the height of the shield relative to the ground to be easily adjusted.

It is another object of my invention to provide a simple shield mounting that permits adjustment of the spacing between adjacent shields.

It is still another object of my invention to provide a simple shield mounting that permits the shields to be easily raised with the tool gang and then returned to their original position.

Other objects and advantages will appear from the following description considered in conjunction with the attached drawings, in which.

My mounting arrangement for the shield provides an arrangement wherein the shield is pushed, rather than pulled as in the prior art. This pushing arrangement provides (a) better trash clearing characteristic because the trash will automatically raise the shield, (b) less lifting effort will be required to raise the shield because of the rear mounting of the pivot, and (c) the trailing edge of the shield will have less vertical movement than prior art shields.

Figure 1:
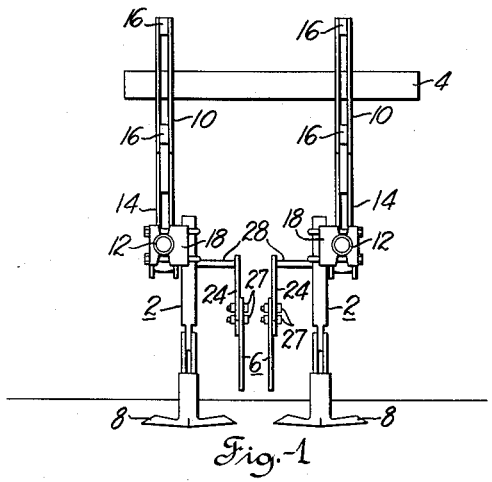
FIG. 1 is a front view of a cultivator, illustrating the position of the shields between the cultivator shovels.

Referring to FIG. 1, there is disclosed a plurality of tool gangs 2 supported by a square support bar 4 carried by a tractor (not shown). Each tool gang 2 carries a shield 6 that is positioned to be between the plants and tools 8.

Each tool gang 2 (FIG. 2) comprises a hanger 10 which receives support bar 4, a gang tube 12 carrying a standard 14, parallel links 16, 16 interconnecting hanger 10 and standard 14, and ground engaging tools 8 adjustably fixed by clamps 18 to gang tube 12. This specific type of tool gang is more fully disclosed in copending application S.N. 718,515, of W. H. Tanke.

Figure 4:
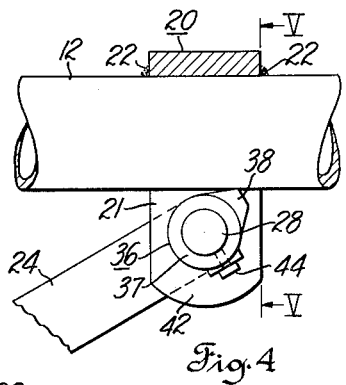
FIG. 4 is an enlarged view of FIG. 2 with certain portions of the support cut away to illustrate the cooperation of the abutment with the tool gang tube.
Figure 5:
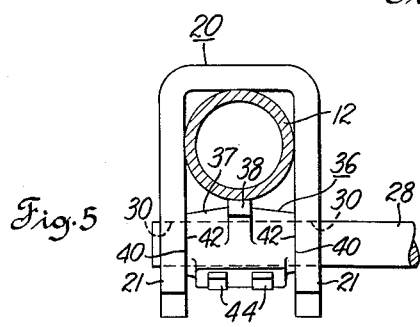
FIG. 5 is a sectional view of FIG. 4 taken in the direction of arrow V—V illustrating the mounting of the stop means in the support.

A support 20 (FIG. 2) is provided to carry said shield 6. Support 20 is in the shape of an inverted U (FIG. 5) and receives gang tube 12 between its legs 21. The support is fixed to the gang tube, as by weldments 22 (FIG. 4).

Means 24, 26, 28, 30 are provided to pivotally connect said shield to support 20, and comprises, a link 24, means 26 fixedly connecting one end of said link to said shield, and means 28, 30 pivotally connecting the other end of said link to said support.

Figure 2:
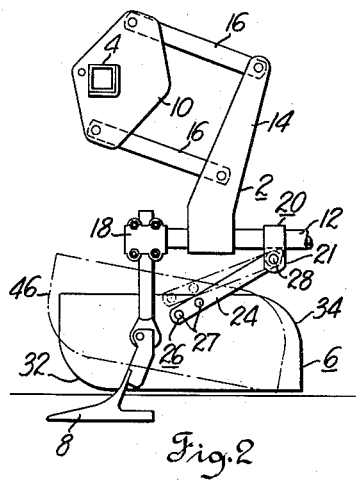
FIG. 2 is a side view of FIG. 1, viewed from the right showing the shield in lowered position, with its raised position as it engages trash shown in dotted lines.

Referring to FIG. 2, it will be noted that link 24 extends rearwardly from shield 6 toward support 20, and that link 24 is pivotally connected to support 20 at a point that is toward the rear of said shield.

Means 26 fixedly connecting one end of link 24 to shield 6 comprises bolts 27.

Means 28, 30 that pivotally connects the other end of link 24 to support 20 comprises, shaft 28 (FIGS. 3 and 5) fixed to the end of link 24, and openings 30 (FIG. 5) provided in legs 21 of support 20 to rotatably receive shaft 28.

Shield 6 itself is a plate member having the lower portion of leading edge 32 curved so it will ride over obstructions and trash. The upper portion of trailing edge 34 of shield 6 is also curved so that shield 6 can be reversed end for end.

Figure 3:
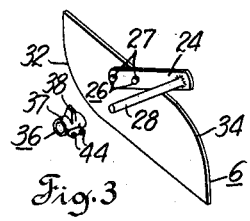
FIG. 3 is a perspective exploded view of a shield and its stop means.

Referring to FIG. 3, stop means 36 in the form of a sleeve 37 is provided on shaft 28 to limit the radial and axial movement of said shield. Sleeve 37 (FIG. 4) carries an abutment 38 projecting from its surface which contacts the underside of gang tube 12 to limit rearward or counterclockwise radial movement of link 24. Ends 40, 40 (FIG. 5) of sleeve 37 contact the inside surfaces 42 of legs 21 of support 20 to limit axial movement of shaft 28.

Means are provided to lock the sleeve to shaft 28, and comprises set screws 44. The set screws are threaded through sleeve 37 and abut shaft 28 to lock sleeve 37 and shaft 28 together. It will be noted that when set screws 44 are loosened shaft 28 can be adjusted both radially and axially.

Shield 6 is shown in dotted lines 46 in FIG. 2 as it would appear when raised to provide trash clearance. As can be seen in comparing the raised and lowered positions in FIG. 2, the trailing end of the shield has actually moved down rather than up and has moved vertically very little between the two positions. As a result, there is no danger of dirt flowing underneath the shield to cover the young plants when the shield is raised for trash clearance.

It will be noted that when tool gang 2 is raised abutment 38 will abut gang tube 12 so that shield 6 will also be raised. When tool gang 2 is lowered, shield 6 will still be in its proper position. Once stop means 36 has been radially and axially adjusted there will be no reason for changing this adjustment.

Operation

To adjust the shields, all that is required is that tool gang 2 be lowered into ground engaging position, and set screws 44, 44 of each shield be loosened so each shield 6 can be placed at the right height above the ground. It will be noted that each individual shield can be placed at differing heights if desired. Before tightening the set screws, shafts 28 are moved axially to provide the desired spacing between the shields. The set screws are then tightened to hold the shields in their adjusted position.

*Summary*

I have provided a simple shield mounting that (1) will not permit an excess flow of dirt under the shield when the shield is raised to clear trash, but (2) will permit the height the shield is above the ground to be adjusted to vary the flow of dirt under the shield, and (3) will permit spacing the shields to accommodate various size plants, and (4) will also permit easy raising and lowering of the shields with the tool gang while still maintaining the shields' original setting.

Although but a single embodiment of the present invention has been illustrated and described, it will be apparent to one skilled in the art that various changes and modifications may be made therein without departing from the invention as defined in the appended claims.

What is claimed is:

1. In a farming implement, the combination of a crop shield and an arrangement for mounting said crop shield from a tool gang so said crop shield can pivot during forward movement of said tool gang, comprising: an elongated crop shield having a leading portion and a trailing portion; a support adapted to be carried by said tool gang; a link; means pivotally connecting the rear end of said link to said support for pivoting about an axis transverse to the direction of travel; means connecting the front end of said link to said shield; said link extending rearwardly from said shield to said support so said shield as it is pushed by said link can pivot about said pivot axis upon upward movement of said shield when encountering trash or other obstructions during movement of said tool gang; and, stop means connected with said link and cooperating with said tool gang to prevent said front end of said link that is connected to said shield, from moving rearwardly of said means that pivotally connects said rear end of said link to said support.

2. In a farming implement, the combination of a crop shield and an arrangement for mounting said crop shield from a tool gang so said crop shield can pivot during forward movement of said tool gang, comprising: an elongated crop shield having a leading portion and a trailing portion; a support adapted to be carried by said tool gang; a link; means pivotally connecting the rear end of said link to said support for pivoting about an axis transverse to the direction of travel; means fixedly connecting the front end of said link to said shield; said link extending rearwardly from said shield to said support so said shield as it is pushed by said link can pivot about said pivot axis upon upward movement of said shield when encountering trash or other obstructions during movement of said tool gang, said link raising said leading portion of said shield higher than said trailing portion of said shield during said forward movement when riding over said trash or other obstructions; and, stop means connected with said link and cooperating with said tool gang to prevent said front end of said link that is connected to said shield, from moving rearwardly of said means that pivotally connects said rear end of said link to said support.

3. In a farming implement, an arrangement for mounting a crop shield from a tool gang so said crop shield can pivot during forward movement of said tool gang, comprising: an inverted U-shaped support carried by said tool gang; a link; a shaft fixed to said link and rotatably carried by the legs of said U-shaped support; means fixedly connecting the front end of said link to said shield, said link extending rearwardly from said shield to said support so said shield as it is pushed by said link can pivot about said support; said link raising the leading portion of said shield higher than the trailing portion of said shield during said forward movement when said shield rides over trash or other obstructions; and, an adjustable stop means carried by said shaft between said legs of said support and cooperating with said tool gang to vary the limit of vertical downward movement of said shield.

4. A device as set forth in claim 3, wherein said stop means includes a sleeve that receives said shaft, said sleeve having an abutment projecting therefrom that engages a portion of said tool gang, and means carried by said sleeve and cooperating with said shaft for fixing said sleeve to said shaft.

5. A device as set forth in claim 4, wherein the ends of said sleeve of said stop means cooperate with the sides of said legs of said support to limit axial movement of said shaft that is connected to said link.

References Cited in the file of this patent
UNITED STATES PATENTS

| | | |
|---|---|---|
| 118,267 | Perry | Aug. 22, 1871 |
| 148,226 | Marsh | Mar. 3, 1874 |
| 546,675 | Nuckolls | Sept. 24, 1895 |
| 549,508 | Frost | Nov. 12, 1895 |
| 1,661,985 | Wilson | Mar. 6, 1928 |
| 2,543,921 | McCullar | Mar. 6, 1951 |
| 2,713,817 | Coyle | July 26, 1955 |